United States Patent [19]
Sato et al.

[11] Patent Number: 5,546,230
[45] Date of Patent: Aug. 13, 1996

[54] ZOOM LENS

[75] Inventors: Hiroshi Sato, Tokyo; Hiroyuki Hamano, Kanagawa-ken, both of Japan

[73] Assignee: Canon Kabushiki Kaisha, Tokyo, Japan

[21] Appl. No.: 158,987

[22] Filed: Nov. 30, 1993

[30] Foreign Application Priority Data

Dec. 2, 1992 [JP] Japan .................. 4-350359

[51] Int. Cl.$^6$ .............. G02B 15/14; G02B 13/18
[52] U.S. Cl. .......................... 359/684; 359/714
[58] Field of Search ................ 359/684, 683, 359/714

[56] References Cited

U.S. PATENT DOCUMENTS

| | | | |
|---|---|---|---|
| 4,832,471 | 5/1989 | Hamano | 359/683 |
| 4,934,796 | 6/1990 | Sugiura et al. | 359/683 |
| 4,988,174 | 1/1991 | Horiuchi et al. | 359/683 |
| 5,050,972 | 9/1991 | Mukaiya et al. | 359/683 |
| 5,134,524 | 7/1992 | Hamano et al. | 359/687 |
| 5,138,492 | 8/1992 | Hamano et al. | 359/684 |
| 5,202,992 | 4/1993 | Banno et al. | 359/684 |
| 5,299,064 | 3/1994 | Hamano et al. | 359/684 |
| 5,363,242 | 11/1994 | Yokota | 359/684 |
| 5,414,562 | 5/1995 | Ueda | 359/683 |
| 5,430,576 | 7/1995 | Hamano et al. | 359/684 |
| 5,440,430 | 8/1995 | Sato | 359/684 |

FOREIGN PATENT DOCUMENTS

| | | |
|---|---|---|
| 58-136012 | 8/1983 | Japan . |
| 58-129404 | 8/1983 | Japan . |
| 58-160913 | 9/1983 | Japan . |
| 60-6914 | 1/1985 | Japan . |
| 61-258217 | 11/1986 | Japan . |
| 62-247316 | 10/1987 | Japan . |
| 63-44614 | 2/1988 | Japan . |

*Primary Examiner*—Georgia Y. Epps
*Assistant Examiner*—Evelyn A. Lester
*Attorney, Agent, or Firm*—Fitzpatrick, Cella, Harper & Scinto

[57] ABSTRACT

A zoom lens is disclosed, comprising, from front to rear, a first lens unit of positive refractive power, a second lens unit of negative refractive power, a third lens unit of positive refractive power, a fourth lens unit of positive refractive power and a fifth lens unit of negative refractive power, the second and fourth lens units being moved to effect zooming. The first lens unit is constructed from a negative first lens and a positive second lens.

6 Claims, 7 Drawing Sheets

Fno/ 2.00
d-LINE
g-LINE
-0.40  0.40
SPHERICAL ABERRATION

ω = 25.80°
ΔM
ΔS
-0.40  0.40
ASTIGMATISM

ω = 25.80°
-5.00  5.00
DISTORTION(%)

ω = 25.80°
-0.10  0.10
LATERAL CHROMATIC ABERRATION (g-LINE)

Fno/ 2.47
d-LINE
g-LINE
-0.40  0.40
SPHERICAL ABERRATION

ω = 9.63°
ΔM
ΔS
-0.40  0.40
ASTIGMATISM

ω = 9.63°
-5.00  5.00
DISTORTION(%)

ω = 9.63°
-0.10  0.10
LATERAL CHROMATIC ABERRATION (g-LINE)

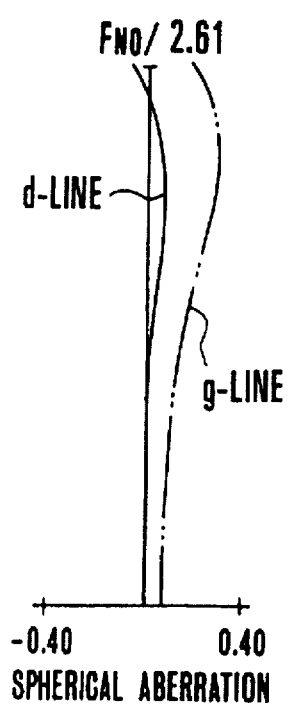 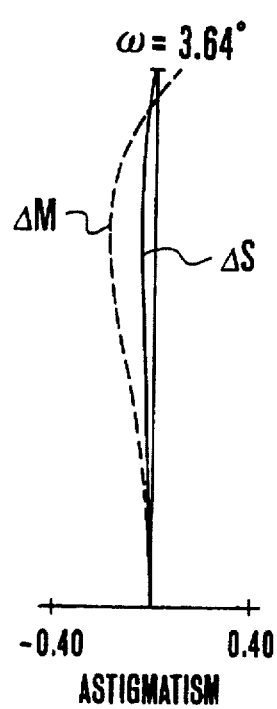 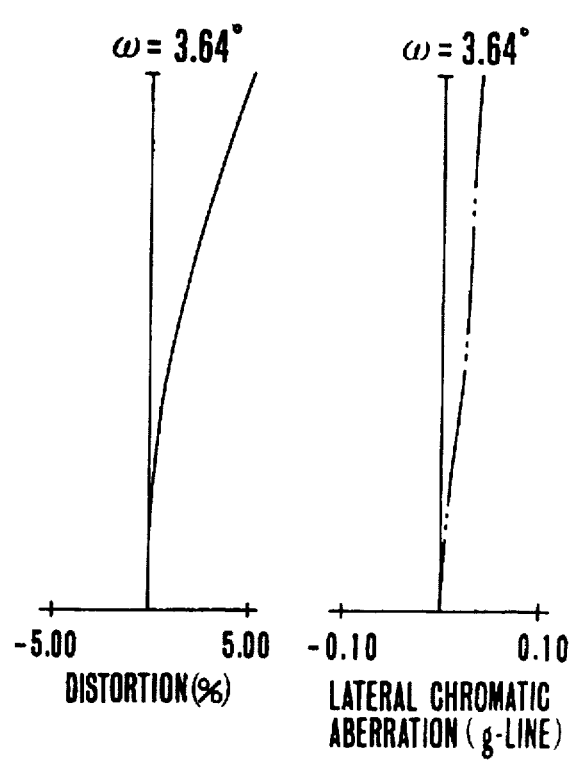 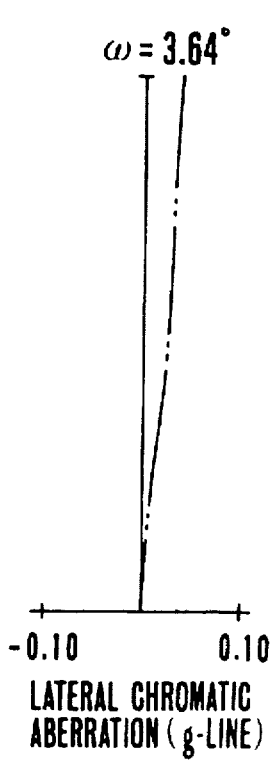
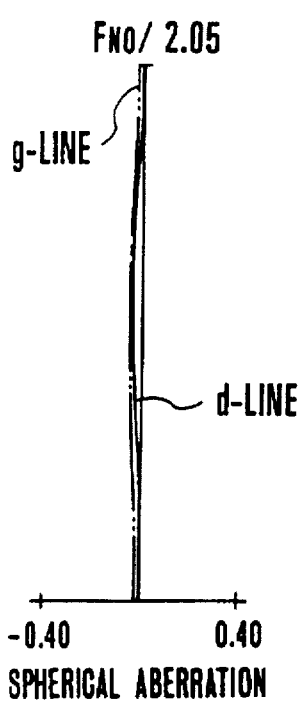 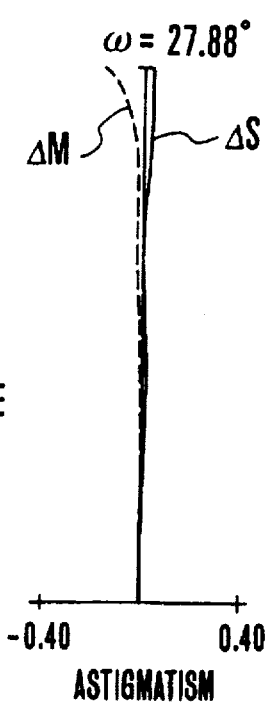 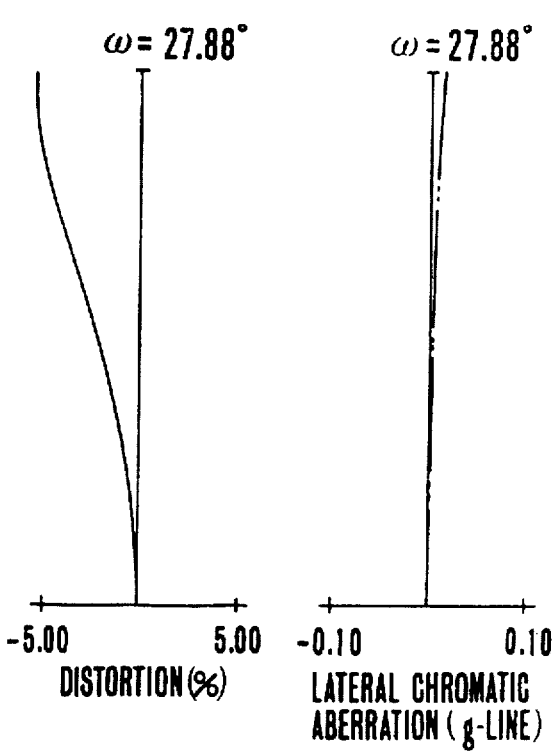 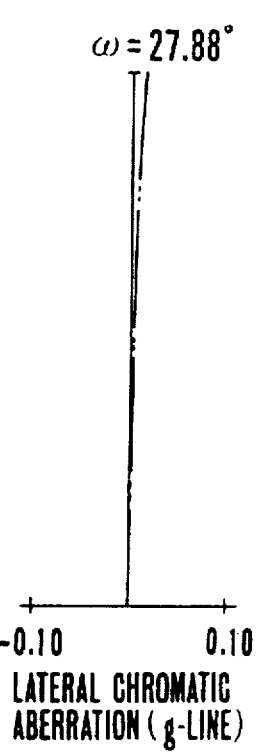

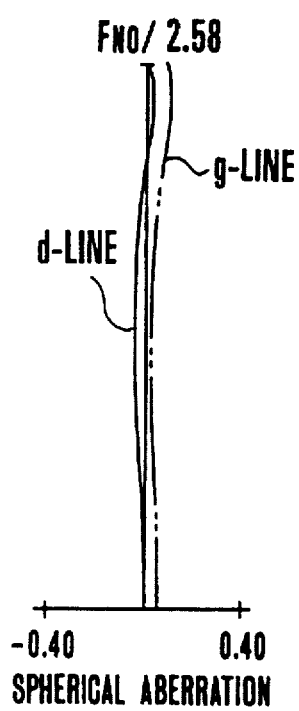
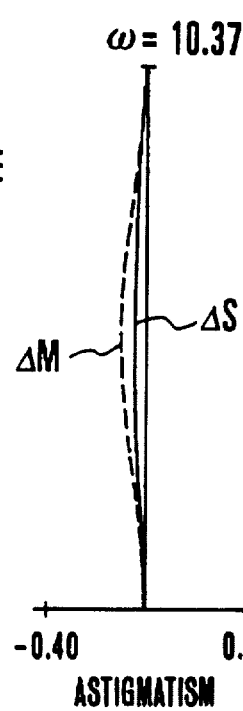
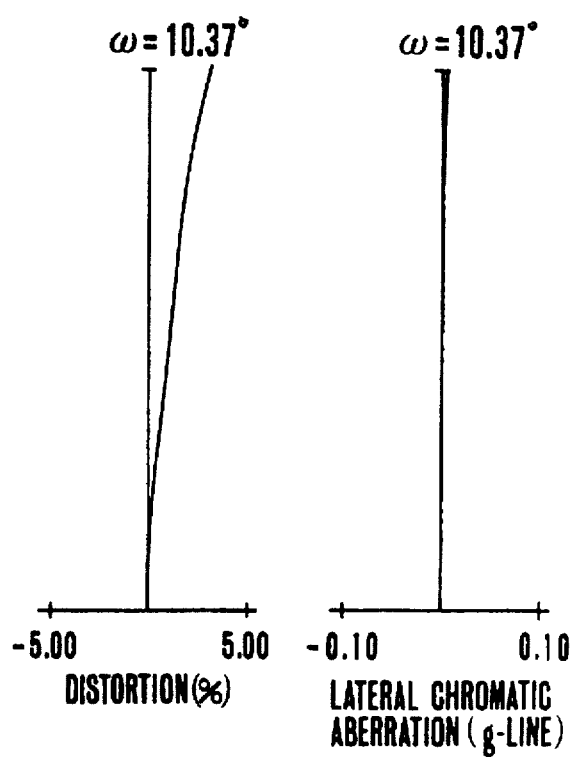
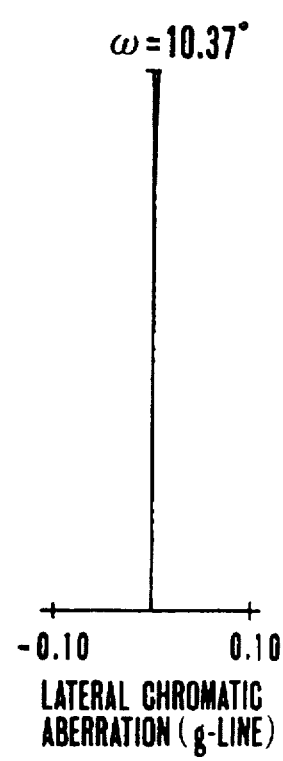
FIG.9A  FIG.9B  FIG.9C  FIG.9D
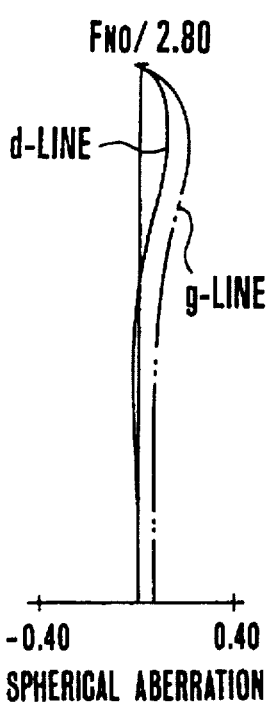
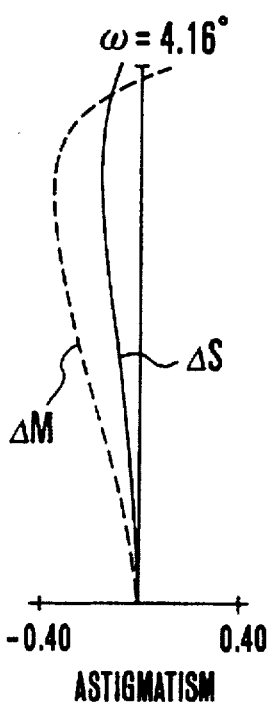
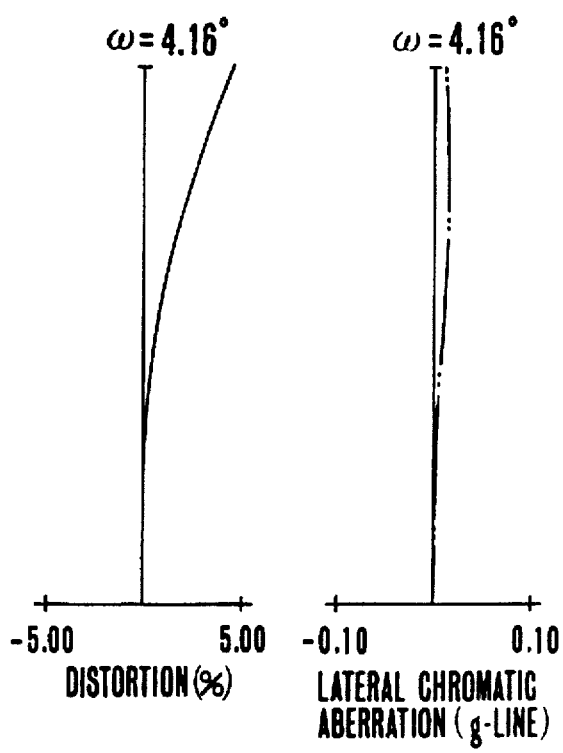
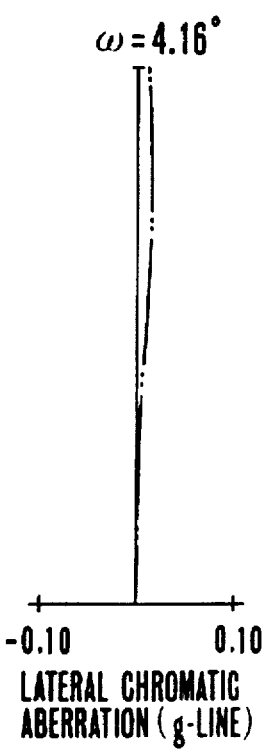
FIG.10A  FIG.10B  FIG.10C  FIG.10D

FIG.11A
Fno/ 2.05
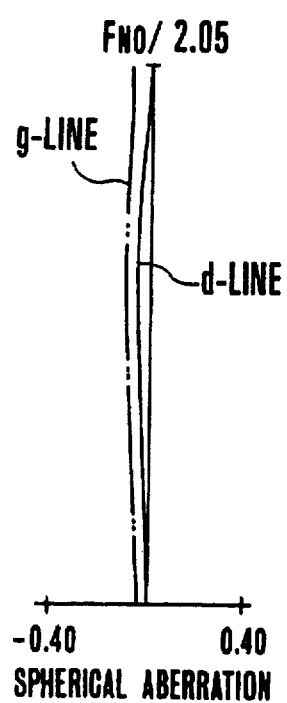
-0.40  0.40
SPHERICAL ABERRATION
FIG.11B
ω=28.04°
-0.40  0.40
ASTIGMATISM
FIG.11C
ω=28.04°
-5.00  5.00
DISTORTION(%)
FIG.11D
ω=28.04°
-0.10  0.10
LATERAL CHROMATIC
ABERRATION (g-LINE)
FIG.12A
Fno/ 2.55
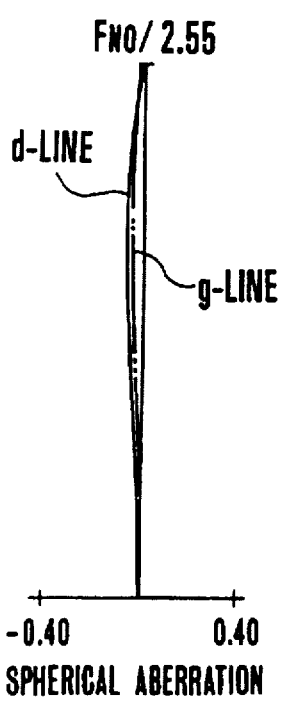
-0.40  0.40
SPHERICAL ABERRATION
FIG.12B
ω=10.43°
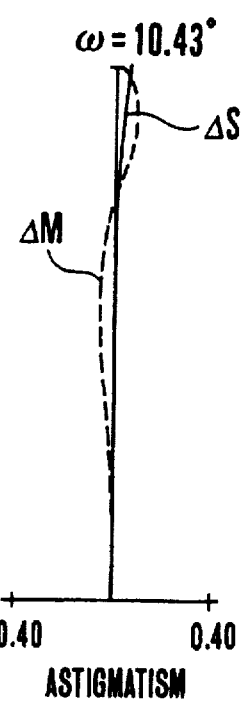
-0.40  0.40
ASTIGMATISM
FIG.12C
ω=10.43°
-5.00  5.00
DISTORTION(%)
FIG.12D
ω=10.43°
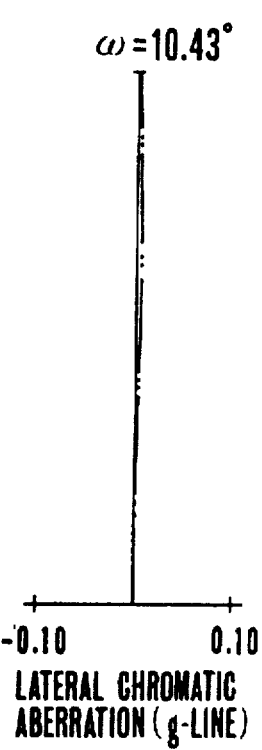
-0.10  0.10
LATERAL CHROMATIC
ABERRATION (g-LINE)

s
ZOOM LENS

BACKGROUND OF THE INVENTION

1. Field of the Invention

This invention relates to zoom lenses of the rear focus type and, more particularly, to zoom lenses of the rear focus type, which have as high a range as 8 and as large a relative aperture as about 2.0 in F-number, which are suited to be used in photographic cameras, video cameras or broadcast cameras.

2. Description of the Related Art

For the photographic camera or video camera, there have been previously proposed many zoom lenses which make a focusing provision in other than the front or first lens unit, or employ the so-called "rear focus" type.

In general, the rear focus type of zoom lens has an advantage over the conventional type which moves the first lens unit for purposes of focusing. For example, the effective diameter of the first lens unit becomes smaller, making it easy to minimize the size of the entire lens system. Also, close-up photography, particularly photomacrography, becomes easy to carry out. Further, because a lens unit to be moved for focusing is relatively small in size and light in weight, a weaker driving power suffices for moving the lens unit. Thus, it is made possible to speed up the focusing adjustment.

A zoom lens of such rear focus type disclosed in, for example, Japanese Laid-Open Patent Application No. Sho 63-44614, comprises, from front to rear, a first lens unit of positive refractive power, a second lens unit of negative refractive power for variation of the focal length, a third lens unit of negative refractive power for compensating for the image shift with zooming, and a fourth lens unit of positive refractive power, or is of the so-called 4-unit form, wherein the third lens unit is made use of for purposes of focusing.

However, this zoom lens, because a space for assuring the movement of the third lens unit must be created, tends to result in an increase in the physical length.

In Japanese Laid-Open Patent Application No. Sho 58-136012, the zoom section is comprised of at least three lens units, one of which is moved to effect focusing.

In Japanese Laid-Open Patent Application No. Sho 62-247316, a first lens unit of positive refractive power, a second lens unit of negative refractive power, a third lens unit of positive refractive power and a fourth lens unit of positive refractive power are arranged in this order from the object side, the second, lens unit being moved to vary the focal length, and the fourth lens unit being moved to compensate for the image shift and to perform focusing.

In Japanese Laid-Open Patent Application No. Sho 58-160913, of the four lens units, i.e., the first lens unit of positive refractive power, the second lens unit of negative power and the third and fourth lens units of positive refractive powers, the first and second lens units are made movable for varying the focal length, while simultaneously moving the fourth lens unit to compensate for the image shift. Further, one or two or more of the four lens units are moved to effect focusing.

In Japanese Laid-Open Patent Applications No. Sho 58-129404 and No. Sho 61-258217, there are shown zoom lenses each comprising, from front to rear, a first lens unit of positive refractive power, a second lens unit of negative refractive power, a third lens unit of positive refractive power, a fourth lens unit of positive refractive power and a fifth lens unit of negative refractive power, or 5-unit zoom lenses, wherein the fifth lens unit or a plurality of lens units including the fifth one are moved to effect focusing.

Japanese Laid-Open Patent Application No. Sho 60-6914 has proposed a zoom lens which has a similar form to the 5-unit zoom lens described above and which has a property that, for an object at a particular finite distance, the focusing lens unit takes a constant axial position irrespective of variation of the focal length.

Recently, in the field of video cameras, the tendency to reduce the size of a solid-state image pickup element (CCD) serving as image sensing means is advancing. In place of the conventional solid-state image pickup element of, for example, ⅔ in. or ½ in. size, use is made of smaller or ⅓ in. or ¼ in. image pickup elements. Along with this has come a demand that the zoom lenses to be used be of even smaller size.

Another feature of the taking lens adapted to be used with the video camera is that the distance from the last lens surface to the image plane, that is, the back focal distance, is made so long that, as dust or foreign particles on the last lens surface cast shadow on the image receiving surface of the image pickup element, its influence to the image does not amount to an adverse effect.

However, if the design rules for the zoom lens adapted to, for example, the ½ in. image pickup element are applied to a zoom lens for the ¼ in. image pickup element by reducing all the dimensions merely in proportion, the back focal distance, too, is reduced by that proportion (to ½). Then, the dust on the last lens surface casts its appreciable shadow onto the image receiving surface of the image pickup element, thereby giving rise to a problem that the image quality is considerably lowered.

For this reason, in view of adapting the zoom lens to be used with the video camera, the zoom lens has its back focal distance made longer than a certain value, no matter however small the size of the image pickup element may become.

In general, the use of the rear focus type in the zoom lens leads to the advantage of obtaining a minimized size of the entire lens system, enabling rapid focusing to be done, and further affording easy close-up photography.

On the other hand, however, the variation with focusing of the aberrations is caused to increase. Thus, it becomes very difficult to obtain high optical performance throughout the entire focusing range in such a manner that the size of the entire lens system is minimized.

Particularly for a large relative aperture, high-range zoom lens, the problem of maintaining the optical performance at a high level throughout the entire zooming range and throughout the entire focusing range becomes very difficult to solve.

SUMMARY OF THE INVENTION

The present invention employs the rear focus type for increasing the relative aperture and the range of variation of the focal length, while still permitting the size of the entire lens system to be prevented from increasing. It is, therefore, an object of the invention to provide a zoom lens which has a simple form of structure with the preservation of the predetermined back focal distance, but which still maintains good stability of optical performance throughout the entire zooming range and throughout the entire focusing range.

According to the invention, a zoom lens of the rear focus type comprises, from front to rear, a first lens unit of positive refractive power, a second lens unit of negative refractive power, a third lens unit of positive refractive power, a fourth lens unit of positive refractive power and a fifth lens unit of negative refractive power, the second lens unit being moved axially toward the image side to perform zooming from the wide-angle end to the telephoto end while the fourth lens unit is moved to compensate for the shift of an image plane with zooming, focusing being performed by moving the fourth lens unit, and the first lens unit being composed of a negative first lens and a positive second lens.

BRIEF DESCRIPTION OF THE DRAWINGS

FIGS. 7A–7D show graphic representations of the various aberrations of the numerical example 1 of the invention in the telephoto end.

FIGS. 8A–8D show graphic representations of the various aberrations of the numerical example 2 of the invention in the wide-angle end.

FIGS. 9A–9D show graphic representations of the various aberrations of the numerical example 2 of the Invention in a medium focal length position.

FIGS. 10A–10D show graphic representations of the various aberrations of the numerical example 2 of the invention in the telephoto end.

FIGS. 11A–11D show graphic representations of the various aberrations of the numerical example 3 of the invention in the wide-angle end.

FIGS. 12A–12D show graphic representations of the various aberrations of the numerical example 3 of the invention in a medium focal length position.

DETAILED DESCRIPTION OF THE PREFERRED EMBODIMENTS

Figure 1:
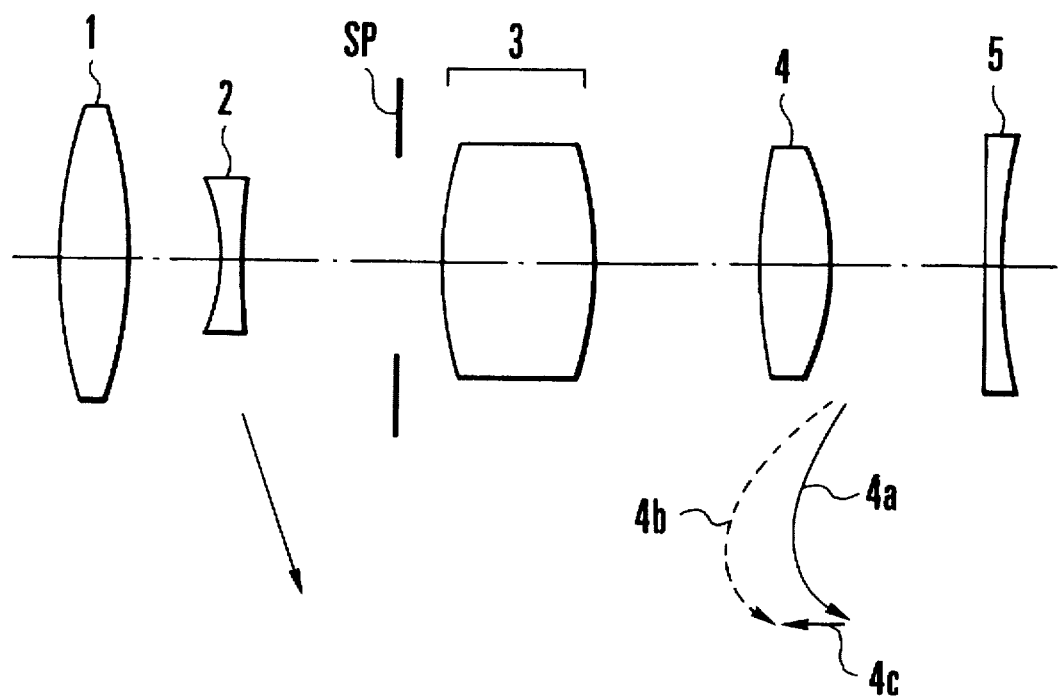
FIG. 1 is a schematic diagram of an embodiment of the invention with the paraxial refractive power arrangement shown.
Figure 2:
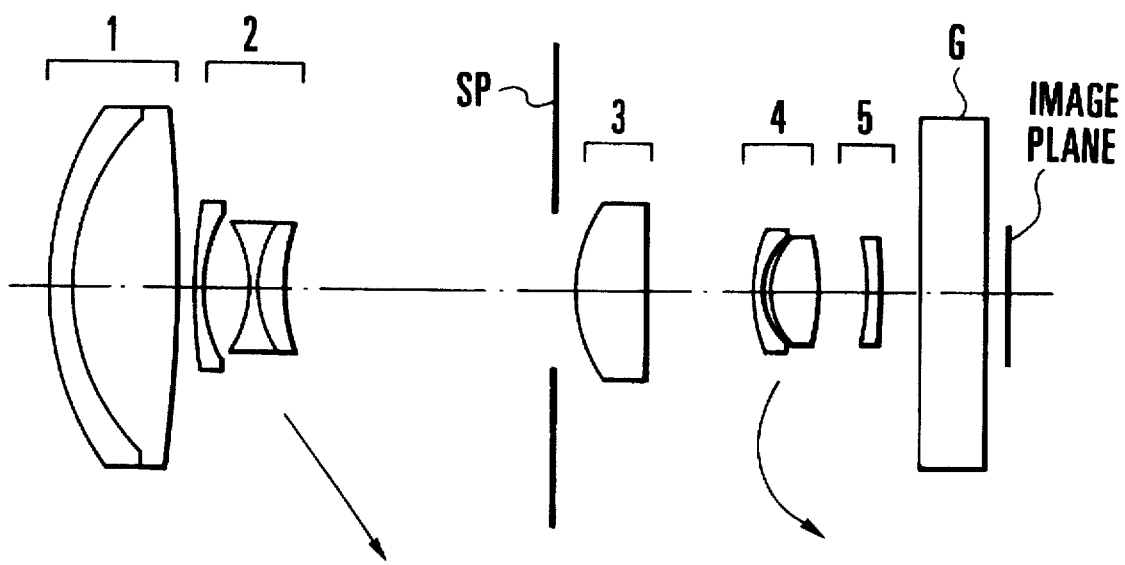
FIG. 2 is a lens block diagram of a numerical example 1 of the invention.
Figure 3:
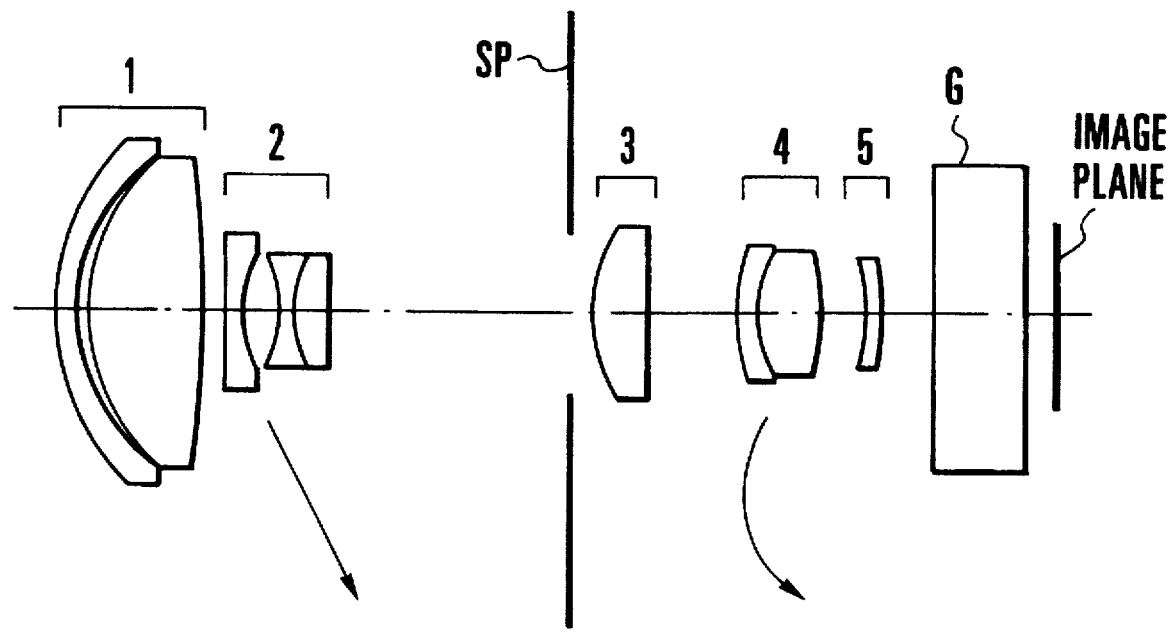
FIG. 3 is a lens block diagram of a numerical example 2 of the invention.
Figure 4:
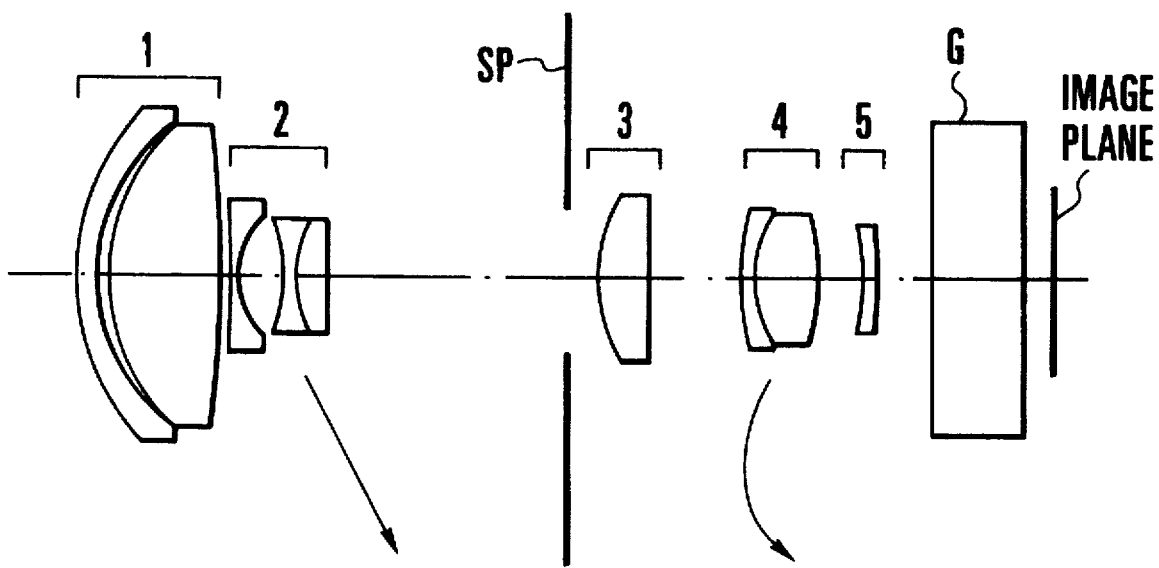
FIG. 4 is a lens block diagram of a numerical example 3 of the invention.
Figure 5A:
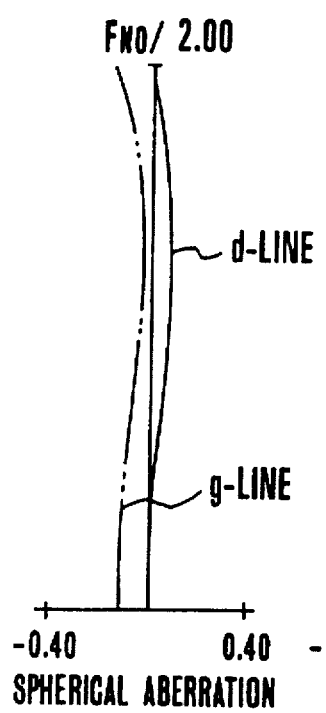
FIGS. 5A–5D show graphic representations of the various aberrations of the numerical example 1 of the invention in the wide-angle end.
Figure 5B:
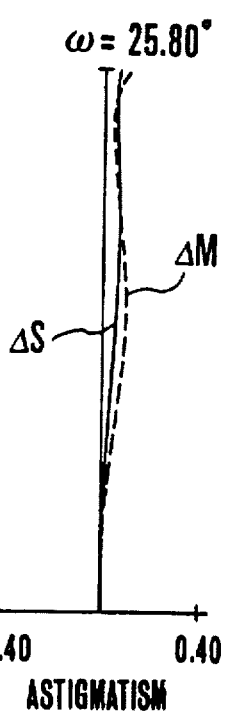
Figure 5C:
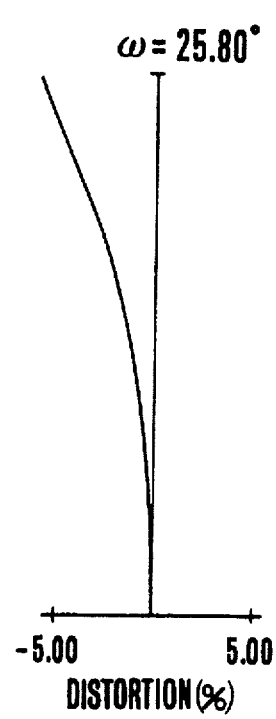
Figure 5D:
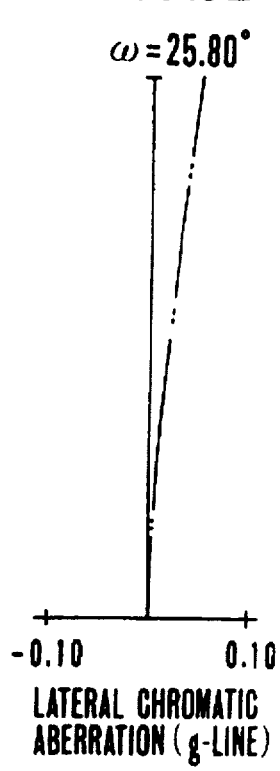
Figure 6A:
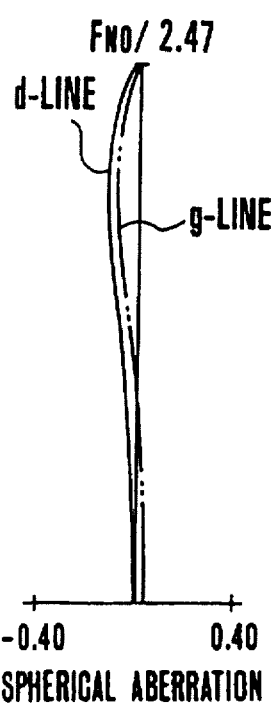
FIGS. 6A–6D show graphic representations of the various aberrations of the numerical example 1 of the invention in a medium focal length position.
Figure 6B:
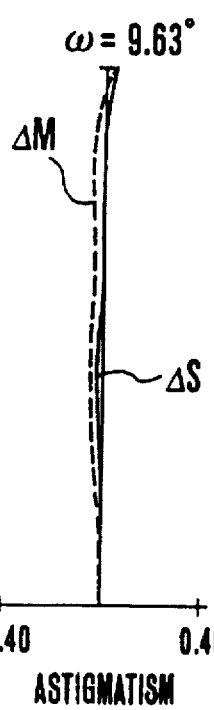
Figure 6C:
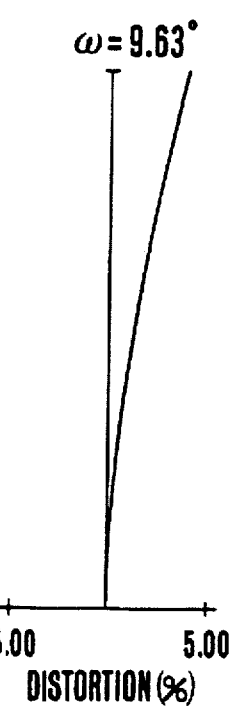
Figure 6D:
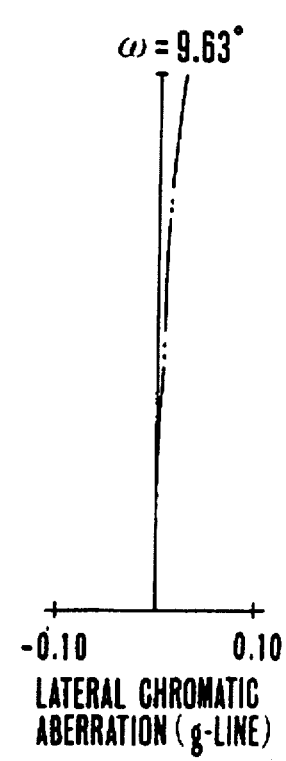
Figure 13A:
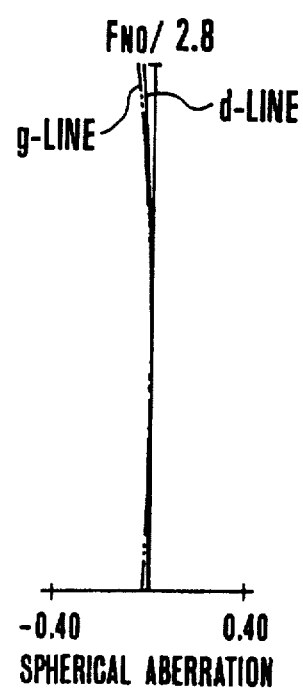
FIGS. 13A–13D show graphic representations of the various aberrations of the numerical example 3 of the invention in the telephoto end.
Figure 13B:
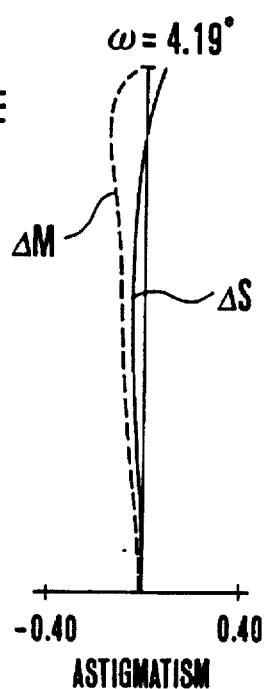
Figure 13C:
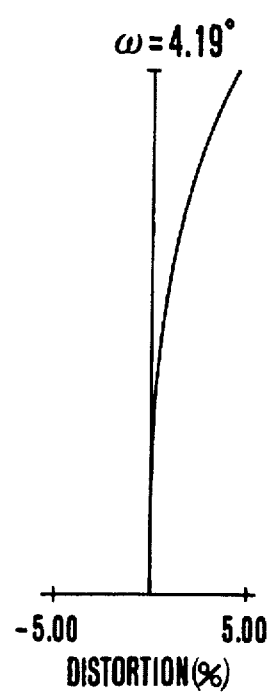
Figure 13D:
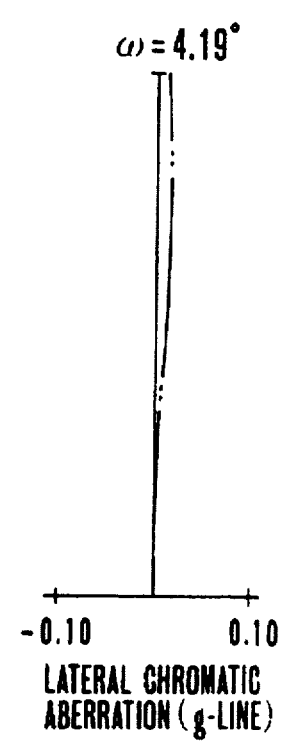

FIG. 1 schematically shows the paraxial refractive power arrangement of a zoom lens of the rear focus type of the invention. Numerical examples 1, 2 and of zoom lenses of the invention are shown in FIG. 2, FIG. 3 and FIG. 4, respectively. The numerical example 1 has aberrations shown in FIGS. 5A–5D, 6A–6D, and 7A–7D for the wide-angle end, the medium position and the telephoto end. The numerical example 2 has aberrations shown in FIGS. 8A–8D, 9A–9D, and 10A–10D for the wide-angle end, the medium position and the telephoto end. The numerical example 3 has aberrations shown in FIGS. 11A–11D, 12A–12D, and 13A–13D for the wide-angle end, the medium position and the telephoto end.

In these figures, reference numeral 1 denotes the first lens unit of positive refractive power; 2 the second lens unit of negative refractive: power; 3 the third lens unit of positive refractive power; 4 the fourth lens unit of positive refractive power; and 5 the fifth lens unit of negative refractive power. SP stands for an aperture stop located in front of the third lens unit 3.

During zooming from the wide-angle end to the telephoto end, the second lens unit moves toward the image side as shown by the arrow, and the resultant shift of an image plane is compensated for by moving the fourth lens unit. The fourth lens unit is also moved axially to effect focusing, that is, the rear focus type is employed.

In FIG. 1, for the fourth lens unit there are shown the solid line curve $4a$ and the dashed line curve $4b$ depicting the loci of motion for compensating for the image shift with zooming from the wide-angle end to the telephoto end when the zoom lens is focused on an object at infinity and at a short distance, respectively. In addition, the first, third and fifth lens units remain stationary during zooming and during focusing.

In the present embodiment, the provision of compensating for the image shift with zooming and the provision of focusing are both made in the fourth lens unit. Particularly, the locus of the total zooming movement of the fourth lens unit is made convex toward the object side as shown by the curves $4a$ and $4b$ in FIG. 1. This enables the space between the third and fourth lens units to be utilized with an improved efficiency. Thus, a shortening of the total length of the entire lens system is advantageously achieved.

In the present embodiment, in the telephoto end, focusing, for example, down from an infinitely distant object to a close object is performed by moving the fourth lens unit forward as shown by the straight line $4c$ in FIG. 1.

In the present embodiment, as compared with the conventional 4-unit zoom lens in which the first lens unit moves forward for focusing, the effective diameter of the first lens unit is advantageously prevented from increasing.

Also, the first lens unit is constructed from two lenses, i.e., a negative first lens and a positive second lens. Thus, the size of the entirety of the first lens unit is minimized.

The use of two lenses in the first lens unit tends to result in the production of aberrations. Particularly for the telephoto end, the spherical aberration is to be less produced. For this purpose, in the numerical example 1, asphere is applied to the third lens surface; in the numerical example 2, to the third and fourth lens surfaces; and in the numerical example 3, to the first and fourth lens surfaces.

In addition, the aperture stop is arranged just in front of the third lens unit, thereby lessening the variation of the aberrations the movable lens units produce. Such arrangement also shortens the distances from the aperture stop to the preceding lens units, thereby making it easier to reduce the diameter of the front lens members.

Besides these, despite the use of the rear focus type in the zoom lens of shortened physical length and greatly extended range, the invention has to reduce the variation of aberrations with zooming, so that a high optical performance is obtained over the entire zooming range. To this end, it is preferable to set forth the following features:

(a) The focal length fi of the i-th lens unit and the magnification β5 of the fifth lens unit satisfy the following conditions:

$$0.8 < |f5/f3| < 2.3 \qquad (1)$$

$$1.1 < \beta 5 < 1.6 \quad (2)$$

The inequalities of condition (1) are concerned with the ratio of the refractive powers of the fifth and third lens units and have an aim to obtain good optical performance while shortening the physical length of the third lens units and those that follow. When the lower limit of the condition (1) is exceeded, as this means that the refractive power of the fifth lens unit is too strong, the negative Petzval sum increases, causing correction of field curvature to become difficult. Conversely when the refractive power of the fifth lens unit is too weak as exceeding the upper limit, no sufficient effect of shortening the physical length of the entire system can be obtained.

The inequalities of condition (2) are concerned with the magnification of the fifth lens unit and have an aim chiefly to sustain the good optical performance over the entire area of the image frame, while shortening the physical length of the entire lens. When the magnification of the fifth lens unit is too small as is beyond the lower limit, the entire lens gets an insufficiently shortened physical length. When the magnification is too large as is beyond the upper limit, the physical length of the entire lens is shortened, but it becomes difficult to obtain a predetermined back focal distance. Further, the distance from the exit pupil to the image plane becomes short, causing the telecentric nature to collapse. In application to the video camera or television camera, therefore, objectionable results are brought about.

(b) Letting the shortest and longest focal lengths of the entire system be denoted by fW and fT, respectively, $$0.25 < |f2/\sqrt{fW \cdot fT}| < 0.4 \quad (3)$$

is satisfied.

The inequalities of condition (3) are concerned with the refractive power of the second lens unit and have an aim to obtain a predetermined zoom ratio with high efficiency, while minimizing the variation of aberrations with zooming. When the refractive power of the second lens unit is too strong as exceeding tile lower limit, the entire lens system becomes easy to minimize in size, but the Petzval sum increases in the negative sense, causing large curvature of field to be produced. In addition, the variation of aberrations with zooming increases. When the refractive power of the second lens unit is too weak as exceeding the upper limit, the variation of aberrations with zooming becomes small, but the required amount of movement of the second lens unit for the predetermined zoom ratio increases largely. Thus, the physical length of the entire lens is increased objectionably.

(c) Letting the air separation between the third and fourth lens units in the wide-angle end with an object at infinity be denoted by DW, $$0.5 < f3/f4 < 1.2 \quad (4)$$

$$0.5 < DW/fW < 0.98 \quad (5)$$

are satisfied.

The inequalities of condition (4) are concerned with the ratio of the third and fourth lens units and have an aim chiefly to shorten the overall physical length of the third lens unit and those that follow, in such a manner that good optical performance is sustained over the entire area of the image frame. When the refractive power of the third lens unit is too strong as exceeding the lower limit, the physical length of the entire lens can be shortened, but it becomes difficult to correct spherical aberration and coma well. Moreover, the predetermined back focal distance is hardly secured. When the refractive power of the third lens unit is too weak as exceeding the upper limit, shortening of the physical length of the entire lens becomes insufficient.

The inequalities of condition (5) are concerned with the air separation between the third and fourth lens units in the wide-angle end when focused on an infinitely distant object and have an aim to obtain good optical performance in such a manner that the overall physical length behind the stop SP is shortened. When the separation between the third and fourth lens units is shorter than the lower limit, this is advantageous for shortening the physical length of the entire lens, but correction of spherical aberration for a region of from the wide-angle end to the medium focal length position becomes difficult. Conversely when the upper limit is exceeded, the overall physical length behind the stop is shortened insufficiently.

In a specific embodiment of the invention, to correct various aberrations in good balance with the limitation of the physical length of the entire lens to a minimum, the third lens unit is constructed from a positive lens having a convex surface facing the object side, the fourth lens unit is constructed from a meniscus-shaped negative lens having a convex surface facing the object side and a positive lens whose surfaces both are convex, and the fifth lens unit is constructed from a meniscus-shaped negative lens having a convex surface facing the image side.

Next, numerical examples of the invention are shown. In the numerical data for these examples, Ri is the radius of curvature of the i-th lens surface when counted from the object side; Di is the i-th lens thickness or air separation when counted from the object side; and Ni and νi are respectively the refractive index and Abbe number of the glass of the i-th lens elements when counted from the object side.

The R18 and R19 in the numerical examples 1 and 3, or the R19 and R20 in the numerical example 2, define a face plate or like glass material.

The shape of an aspheric surface is expressed in ordinates with an X axis in the axial direction and H axis in the direction perpendicular to the optical axis, the direction in which light advances being taken as positive, by the following equation:

$$X = \frac{(1/R_0) H^2}{1 + \sqrt{1 - (1 + K)(H/R)^2}} + BH^4 + CH^6 + DH^8 + EH^{10}$$

where $R_1$ is the radius of the osculating sphere, and K, B, C, D and E are the aspheric coefficients.

Also, the notation "D-X" represents "$10^{-x}$".

Also, the values of the factors in the conditions for the numerical examples are listed in Table-1.

NUMERICAL EXAMPLE 1:

| f = 1–7.6 | Fno. = 1:2–2.261 | 2ω = 51.6°–7.3° | |
|---|---|---|---|
| R1 = 2.861 | D1 = 0.140 | N1 = 1.84666 | ν1 = 23.8 |
| R2 = 1.885 | D2 = 0.960 | N2 = 1.66910 | ν2 = 55.4 |
| *R3 = −11.441 | D3 = Variable | | |
| R4 = 6.177 | D4 = 0.069 | N3 = 1.88300 | ν3 = 40.8 |
| R5 = −1.177 | D5 = 0.388 | | |
| R6 = −1.145 | D6 = 0.069 | N4 = 1.51633 | ν4 = 64.2 |
| R7 = 0.990 | D7 = 0.242 | N5 = 1.84666 | ν5 = 23.8 |
| R8 = 2.240 | D8 = Variable | | |
| R9 = (Stop) | D9 = 0.180 | | |
| *R10 = 1.185 | D10 = 0.604 | N6 = 1.58313 | ν6 = 59.4 |
| R11 = 54.494 | D11 = Variable | | |

-continued

| f = 1–7.6 | Fno. = 1:2–2.261 | 2ω = 51.6°–7.3° | |
|---|---|---|---|
| R12 = 1.098 | D12 = 0.050 | N7 = 1.84666 | ν7 = 23.8 |
| R13 = 0.691 | D13 = 0.040 | | |
| R14 = 0.749 | D14 = 0.397 | N8 = 1.48749 | ν8 = 70.2 |
| R15 = –2.166 | D15 = Variable | | |
| *R16 = –2.317 | D16 = 0.075 | N9 = 1.80610 | ν9 = 33.3 |
| R17 = 16.737 | D17 = 0.377 | | |
| R18 = ∞ | D18 = 0.604 | N10 = 1.51633 | ν10 = 64.2 |
| R19 = ∞ | | | |

*represents the aspheric surface.

| Variable | Focal Length | | |
|---|---|---|---|
| Separation | 1.00 | 2.85 | 7.60 |
| D3 | 0.14 | 1.35 | 2.06 |
| D8 | 2.31 | 1.10 | 0.39 |
| D11 | 0.96 | 0.63 | 0.96 |
| D15 | 0.45 | 0.79 | 0.45 |

| Surface | Ro | K | B | C | D | E |
|---|---|---|---|---|---|---|
| 3 | –1.144 D+01 | 7.388 D–01 | 6.012 D–03 | –1.403 D–04 | –1.777 D–04 | 3.410 D–05 |
| 10 | 1.184 D+00 | –2.750 D–01 | –7.594 D–02 | 2.620 D–03 | 2.379 D–03 | –1.201 D–02 |
| 16 | –2.317 D+00 | 9.832 D–01 | –6.598 D–02 | 1.253 D–01 | 1.077 D–01 | –1.117 D+00 |

NUMERICAL EXAMPLE 2:

| f = 1–7.27 | Fno. = 1:2.05–2.80 | 2ω = 55.76°–8.32° | |
|---|---|---|---|
| R1 = 2.513 | D1 = 0.118 | N1 = 1.84666 | ν1 = 23.8 |
| R2 = 1.788 | D2 = 0.086 | | |
| *R3 = 1.857 | D3 = 1.036 | N2 = 1.60311 | ν2 = 60.7 |
| *R4 = –8.055 | D4 = Variable | | |
| R5 = –24.157 | D5 = 0.107 | N3 = 1.88300 | ν3 = 40.8 |
| R6 = 0.866 | D6 = 0.373 | | |
| R7 = –1.592 | D7 = 0.107 | N4 = 1.51742 | ν4 = 52.4 |
| R8 = 1.145 | D8 = 0.291 | N5 = 1.84666 | ν5 = 23.8 |
| R9 = 9.961 | D9 = Variable | | |
| R10 = (Stop) | D10 = 0.190 | | |
| *R11 = 1.378 | D11 = 0.496 | N6 = 1.58913 | ν6 = 61.2 |
| R12 = –44.217 | D12 = Variable | | |
| R13 = 1.815 | D13 = 0.107 | N7 = 1.84666 | ν7 = 23.8 |
| R14 = 1.898 | D14 = 0.011 | | |
| R15 = 0.934 | D15 = 0.561 | N8 = 1.58913 | ν8 = 61.2 |
| *R16 = –3.224 | D16 = Variable | | |
| R17 = –2.063 | D17 = 0.107 | N9 = 1.80610 | ν9 = 33.3 |
| *R18 = –4.905 | D18 = 0.496 | | |
| R19 = ∞ | D19 = 0.863 | N10 = 1.51633 | ν10 = 64.2 |
| R20 = ∞ | | | |

*represents the aspheric surface.

NUMERICAL EXAMPLE 3:

| f = 1–7.28 | Fno. = 1:2.05–2.80 | 2ω = 56.08°–8.38° | |
|---|---|---|---|
| *R1 = 2.296 | D1 = 0.119 | N1 = 1.84666 | ν1 = 23.8 |
| R2 = 1.708 | D2 = 0.087 | | |
| R3 = 1.844 | D3 = 1.043 | N2 = 1.61800 | ν2 = 63.4 |
| *R4 = –12.370 | D4 = Variable | | |
| R5 = 23.226 | D5 = 0.108 | N3 = 1.88300 | ν3 = 40.8 |
| R6 = 0.785 | D6 = 0.376 | | |
| R7 = –1.707 | D7 = 0.108 | N4 = 1.51742 | ν4 = 52.4 |
| R8 = 1.038 | D8 = 0.293 | N5 = 1.84666 | ν5 = 23.8 |

-continued

| f = 1–7.28 | Fno. = 1:2.05–2.80 | 2ω = 56.08°–8.38° | |
|---|---|---|---|
| R9 = 7.705 | D9 = Variable | | |
| R10 = (Stop) | D10 = 0.190 | | |
| *R11 = 1.400 | D11 = 0.500 | N6 = 1.58913 | ν6 = 61.2 |
| R12 = –33.436 | D12 = Variable | | |
| R13 = 2.024 | D13 = 0.108 | N7 = 1.84666 | ν7 = 23.8 |
| R14 = 0.958 | D14 = 0.565 | N8 = 1.58913 | ν8 = 61.2 |
| *R15 = –3.091 | D15 = Variable | | |
| R16 = –2.208 | D16 = 0.108 | N9 = 1.80610 | ν9 = 33.3 |
| *R17 = –5.576 | D17 = 0.500 | | |
| R18 = ∞ | D18 = 0.869 | N10 = 1.51633 | ν10 = 64.2 |
| R19 = ∞ | | | |

*represents the aspheric surface.

| Variable | Focal Length | | |
|---|---|---|---|
| Separation | 1.00 | 2.89 | 7.27 |
| D4 | 0.12 | 1.35 | 2.08 |
| D9 | 2.21 | 0.98 | 0.26 |
| D12 | 0.85 | 0.42 | 0.74 |
| D16 | 0.43 | 0.86 | 0.55 |

| Surface | Ro | K | B | C | D | E |
|---|---|---|---|---|---|---|
| 3 | 1.857 D+00 | –7.806 D–02 | 2.349 D–03 | –4.347 D–04 | 0.000 D+00 | 0.000 D+00 |
| 4 | –8.055 D+00 | 9.802 D+00 | 1.050 D–02 | –2.064 D–03 | 0.000 D+00 | 0.000 D+00 |
| 11 | 1.378 D+00 | –8.659 D–01 | –1.354 D–02 | 5.787 D–03 | –5.427 D–03 | 2.752 D–03 |
| 16 | –3.224 D+00 | –1.202 D+00 | 2.997 D–02 | 5.850 D–02 | –1.051 D–01 | –3.643 D–01 |
| 18 | –4.905 D+00 | 1.818 D+01 | –1.978 D–02 | 3.777 D–01 | –1.178 D+00 | 1.173 D+00 |

| Variable | Focal Length | | |
|---|---|---|---|
| Separation | 1.00 | 2.89 | 7.28 |
| D4 | 0.06 | 1.30 | 2.03 |
| D9 | 2.22 | 0.99 | 0.26 |
| D12 | 0.86 | 0.43 | 0.74 |
| D15 | 0.43 | 0.86 | 0.55 |

| Surface | Ro | K | B | C | D | E |
|---|---|---|---|---|---|---|
| 1 | 2.296 D+00 | 0.000 D+00 | −2.320 D−04 | 1.910 D−04 | −8.348 D−05 | −1.024 D−04 |
| 4 | −1.237 D+01 | 9.802 D+00 | 4.890 D−03 | −1.166 D−03 | −7.334 D−04 | −2.577 D−04 |
| 11 | 1.400 D+00 | −8.659 D−01 | −1.251 D−02 | 1.645 D−03 | −4.915 D−03 | 7.257 D−03 |
| 15 | −3.091 D+00 | −1.202 D+00 | 5.381 D−02 | 4.003 D−02 | −9.558 D−02 | 4.656 D−02 |
| 17 | −5.576 D+00 | 1.818 D+01 | −1.533 D−02 | 3.898 D−01 | −1.103 D+00 | 1.131 D+00 |

TABLE 1

| | Numerical Example | | |
|---|---|---|---|
| Condition | 1 | 2 | 3 |
| (1) $|f5/f3|$ | 0.82 | 1.97 | 2.01 |
| (2) $\beta 5$ | 1.37 | 1.30 | 1.30 |
| (3) $f2/\sqrt{fW \cdot fT}$ | 0.29 | 0.30 | 0.31 |
| (4) $f3/f4$ | 0.89 | 0.76 | 0.76 |
| (5) $DW/fW$ | 0.96 | 0.85 | 0.86 |

According to the invention, as has been described above, by setting forth the rules of design for the refractive powers of the five lens units and the zooming movements of the second and fourth lens units, and also by employing the lens configuration of moving the fourth lens unit for focusing, the zooming range is extended to 8 to 10 or thereabout, while still permitting minimization of the size of the entire lens system to be achieved. Thus, it is made possible to realize a zoom lens of the rear focus type which is well corrected over the entire extended zooming range and which also maintains good stability of aberration correction over the entire focusing range at as large a relative aperture as 2.0 in F-number.

What is claimed is:

1. A zoom lens comprising, from front to rear, a first lens unit of positive refractive power, a second lens unit of negative refractive power, a third lens unit of positive refractive power, a fourth lens unit of positive refractive power and a fifth lens unit of negative refractive power, zooming being performed by moving said second lens unit and said fourth lens unit, wherein said first lens unit consists of a negative first lens and a positive second lens.

2. A zoom lens according to claim 1, satisfying the following conditions:

$$0.8 < |f5/f3| < 2.3$$

$$1.1 < \beta 5 < 1.6$$

where f5 and f3 are the focal lengths of said fifth and third lens units, respectively, and $\beta 5$ is the magnification of said fifth lens unit.

3. A zoom lens according to claim 2, satisfying the following condition:

$$0.25 < |f2/\sqrt{fW \cdot fT}| < 0.4$$

where fW and fT are the shortest and longest focal lengths of the entire lens system, respectively, and f2 is the focal length of said second lens unit.

4. A zoom lens according to claim 2, satisfying the following conditions:

$$0.5 < f3/f4 < 1.2$$

$$0.5 < DW/fW < 0.98$$

where DW is an air separation between said third and fourth lens units in a wide-angle end at the time of focusing on an infinitely distant object, and wherein f4 is the focal length of said fourth lens unit and fW is the shortest focal length of the entire lens system.

5. A zoom lens according to claim 1, wherein said first lens unit includes at least one aspheric surface.

6. A zoom lens according to claim 1, wherein said fourth lens unit is made movable for focusing.

* * * * *

UNITED STATES PATENT AND TRADEMARK OFFICE
CERTIFICATE OF CORRECTION

PATENT NO. : 5,546,230
DATED : August 13, 1996
INVENTOR(S) : HIROSHI SATO, ET AL.

It is certified that error appears in the above-indentified patent and that said Letters Patent is hereby corrected as shown below:

On the title page: Item

[75]  INVENTORS:

"Kanagawa-ken" should read --Yamato--.

COLUMN 4:

Line 4, "refractive:" should read --refractive--.

COLUMN 5:

Line 31, "0 25" should read --0.25--; and
Line 39, "tile" should read --the--.

Signed and Sealed this

Fourth Day of March, 1997

Attest:

BRUCE LEHMAN

*Attesting Officer*     *Commissioner of Patents and Trademarks*